US012761520B2

(12) United States Patent
Marchewka et al.

(10) Patent No.: US 12,761,520 B2
(45) Date of Patent: Oct. 13, 2026

(54) MICROSPHERES FOR ELECTROPHORETIC DISPLAYS AND METHODS OF MANUFACTURE THEREOF

(71) Applicant: HALION DISPLAYS INC., Kitchener (CA)

(72) Inventors: Ryan Phillip Marchewka, Waterloo (CA); Matthew Thomas Lavrisa, Ottawa (CA); Ka Ho Wong, Waterloo (CA); Yahia Nassab, Mississauga (CA); Natalie Prislinger Pinchin, Brampton (CA); Simran Elizabeth Chathanat, Markham (CA); Simon Liu, Richmond Hill (CA)

(73) Assignee: HALION DISPLAYS INC., Kitchener (CA)

( * ) Notice: Subject to any disclaimer, the term of this patent is extended or adjusted under 35 U.S.C. 154(b) by 858 days.

(21) Appl. No.: 17/922,934

(22) PCT Filed: May 4, 2021

(86) PCT No.: PCT/IB2021/053755
§ 371 (c)(1),
(2) Date: Nov. 2, 2022

(87) PCT Pub. No.: WO2021/224800
PCT Pub. Date: Nov. 11, 2021

(65) Prior Publication Data

US 2023/0176440 A1 Jun. 8, 2023

Related U.S. Application Data

(60) Provisional application No. 63/019,648, filed on May 4, 2020.

(51) Int. Cl.
*G02F 1/16757* (2019.01)
*B01J 13/18* (2006.01)
(Continued)

(52) U.S. Cl.
CPC ........ *G02F 1/16757* (2019.01); *B01J 13/185* (2013.01); *B01J 13/22* (2013.01); *G02F 1/167* (2013.01); *G02F 1/1685* (2019.01)

(58) Field of Classification Search
CPC ................. G02F 1/167; G02F 1/16757; G02F 2001/1678; G02F 1/1334; G02F 1/1676;
(Continued)

(56) References Cited

U.S. PATENT DOCUMENTS

| | | | |
|---|---|---|---|
| 6,017,584 | A | 1/2000 | Albert et al. |
| 6,067,185 | A | 5/2000 | Albert et al. |

(Continued)

FOREIGN PATENT DOCUMENTS

| | | | |
|---|---|---|---|
| CN | 1641398 | A | 7/2005 |
| CN | 103540162 | A | 1/2014 |

(Continued)

*Primary Examiner* — Brandi N Thomas
(74) *Attorney, Agent, or Firm* — PERRY + CURRIER INC.

(57) ABSTRACT

An example display assembly includes: an outer substrate; an inner substrate; a first electrode and a second electrode disposed between the inner substrate and the outer substrate in a spaced apart relationship; and at least one substantially planar microstructure between the first and second electrodes, the microstructure containing an electrophoretic media, and wherein the electrophoretic media comprises a first chemical entity and a second chemical entity, wherein the first and second chemical entities are to be induced to reversibly interact to switch between a separated state and an optically active state in response to a change in an electromagnetic field applied to the electrophoretic media by the first and second electrodes to change an optical property of the electrophoretic media.

8 Claims, 7 Drawing Sheets

(51) Int. Cl.

| | |
|---|---|
| ***B01J 13/22*** | (2006.01) |
| ***G02F 1/167*** | (2019.01) |
| ***G02F 1/1685*** | (2019.01) |

(58) Field of Classification Search

CPC ...... G02F 1/1343; G02F 1/155; G02F 1/1341; G02F 1/16756; G02F 1/16755; G02F 2202/36; G02F 2203/01; G09G 3/344; G09G 2300/023; G09G 2380/14; G09G 2300/0426

See application file for complete search history.

(56) References Cited

U.S. PATENT DOCUMENTS

| | | | | |
|---|---|---|---|---|
| 6,741,386 | B2 | 5/2004 | Minami | |
| 7,202,991 | B2 | 4/2007 | Zhang et al. | |
| 2003/0086149 | A1 | 5/2003 | Kawai | |
| 2004/0054031 | A1 | 3/2004 | Jacobson | |
| 2005/0012979 | A1 | 1/2005 | Minami | |
| 2005/0152017 | A1 | 7/2005 | Reboa | |
| 2007/0046623 | A1* | 3/2007 | Song | G09G 3/344 345/107 |
| 2011/0090186 | A1* | 4/2011 | Yamazaki | G06F 3/041 345/204 |
| 2012/0307244 | A1 | 12/2012 | Sharpe et al. | |
| 2012/0307344 | A1 | 12/2012 | Han et al. | |
| 2018/0284489 | A1 | 10/2018 | Wang et al. | |

FOREIGN PATENT DOCUMENTS

| | | | | |
|---|---|---|---|---|
| CN | 104945590 | A | 9/2015 | |
| CN | 105188905 | * | 12/2015 | A61P 43/00 |
| JP | 2001242806 | A | 9/2001 | |
| JP | 20040500583 | A | 1/2004 | |
| JP | 2004070204 | A | 3/2004 | |
| JP | 20040138930 | A | 5/2004 | |
| JP | 2006030471 | A | 2/2006 | |
| JP | 2006259323 | A | 9/2006 | |
| JP | 2008058542 | A | 3/2008 | |
| JP | 2009251048 | A | 10/2009 | |
| JP | 2010217233 | A | 9/2010 | |
| JP | 2011227109 | A | 11/2011 | |
| JP | 2013225031 | A | 10/2013 | |
| JP | 2015018209 | * | 1/2015 | G02F 1/16755 |
| JP | 2015226899 | A | 12/2015 | |
| JP | 2016525706 | A | 8/2016 | |
| KR | 20060124035 | A | 12/2006 | |

* cited by examiner

MICROSPHERES FOR ELECTROPHORETIC DISPLAYS AND METHODS OF MANUFACTURE THEREOF

FIELD

The specification relates generally to display panel technologies, and more particularly to microspheres for electrophoretic displays and methods of manufacture thereof.

BACKGROUND

Various technologies are employed in the manufacture of display panels. Some, e.g. liquid crystal and electrowetting displays, suffer from optical losses, leading to inefficient use of backlight. Others, such as electrochromic displays, suffer from slow response times and increased voltage requirements to drive pixels compared to LCD and electrowetting displays.

SUMMARY

According to an aspect of the present specification, a display device including microspheres is provided. The display device includes: an outer substrate; an inner substrate; a first electrode and a second electrode disposed between the inner substrate and the outer substrate in a spaced apart relationship; and a plurality of microspheres between the first and second electrodes, each microsphere comprising a spherical shell enclosing an electrophoretic media, wherein the electrophoretic media comprises a charged particle comprising one or more first chemical entities and an oppositely charged particle comprising one or more second chemical entities, wherein the first and second chemical entities are to be induced to reversibly interact to switch between a separated state and an optically active state in response to a change in an electromagnetic field applied to the electrophoretic media by the first and second electrodes to change an optical property of the electrophoretic media.

According to another aspect of the present specification, a method of fabricating microspheres for an electrophoretic display is provided. The method includes: obtaining an emulsion of aqueous droplets dispersed in an oil phase, the aqueous droplets including an electrophoretic media, the electrophoretic media comprising a charged particle comprising one or more first chemical entities and an oppositely charged particle comprising one or more second chemical entities, wherein the first and second chemical entities are to be induced to reversibly interact to switch between a separated state and an optically active state in response to a change in an electromagnetic field applied to the electrophoretic media to change an optical property of the electrophoretic media; adding precursors to the emulsion; and forming shells at respective surfaces of each aqueous droplet, wherein the shells are formed via reactions of the precursors at the respective surfaces of each aqueous droplet.

According to another aspect of the present specification, a method of fabricating an electrophoretic display device is provided. The method includes: providing a substrate layer; obtaining an emulsion of aqueous droplets dispersed in an oil phase, the aqueous droplets including an electrophoretic media, the electrophoretic media comprising a charged particle comprising one or more first chemical entities and an oppositely charged particle comprising one or more second chemical entities, wherein the first and second chemical entities are to be induced to reversibly interact to switch between a separated state and an optically active state in response to a change in an electromagnetic field applied to the electrophoretic media to change an optical property of the electrophoretic media; adding precursors to the emulsion; forming shells at respective surfaces of each aqueous droplet, wherein the shells are formed via reactions of the precursors at the respective surfaces of each aqueous droplet to form microspheres; collecting the microspheres via settling or centrifugation; and arranging a plurality of the microspheres into a lattice on the substrate.

BRIEF DESCRIPTION OF DRAWINGS

Implementations are described with reference to the following figures, in which.

DETAILED DESCRIPTION

The description below sets out certain structures and methods of manufacture for display assemblies employing electrophoretic media to control the color, contrast, and other visual attributes of the display assembly. A detailed discussion of the electrophoretic media is provided in PCT application no. PCT/IB 62019/058306 filed Sep. 30, 2019, the contents of which is incorporated herein by reference.

In brief, in some embodiments, the electrophoretic media includes two sets of nanoparticles. The particles in the first set include a negatively charged core and a polymeric corona functionalized with an optically active component. The particles in the second set include a positively charged core and a polymeric corona functionalized with a stabilizing component. The charge of the particles can be switched without loss of generality. The two component entities are selected to interact with one another when a positively charged nanoparticle is sufficiently close to a negatively charged nanoparticle and their polymeric coronae interact. When the component entities interact, they form a complex with different absorption characteristics than the separated components. For example, when separated the nanoparticles may be substantially transparent, and when physically close enough for the component entities to interact the nanoparticles may transmit certain wavelengths of light (e.g. red) and absorb others.

Thus, by controlling electric fields applied to a fluid containing nanoparticles from both of the above-mentioned sets, the separation distance between the nanoparticles can be controlled, which affects how many of the nanoparticles interact and therefore the degree to which the optical characteristics of the fluid are altered. A variety of materials, as well as additional discussion on the behavior of such materials, are provided in the above-mentioned co-pending PCT application.

Figure 1A:
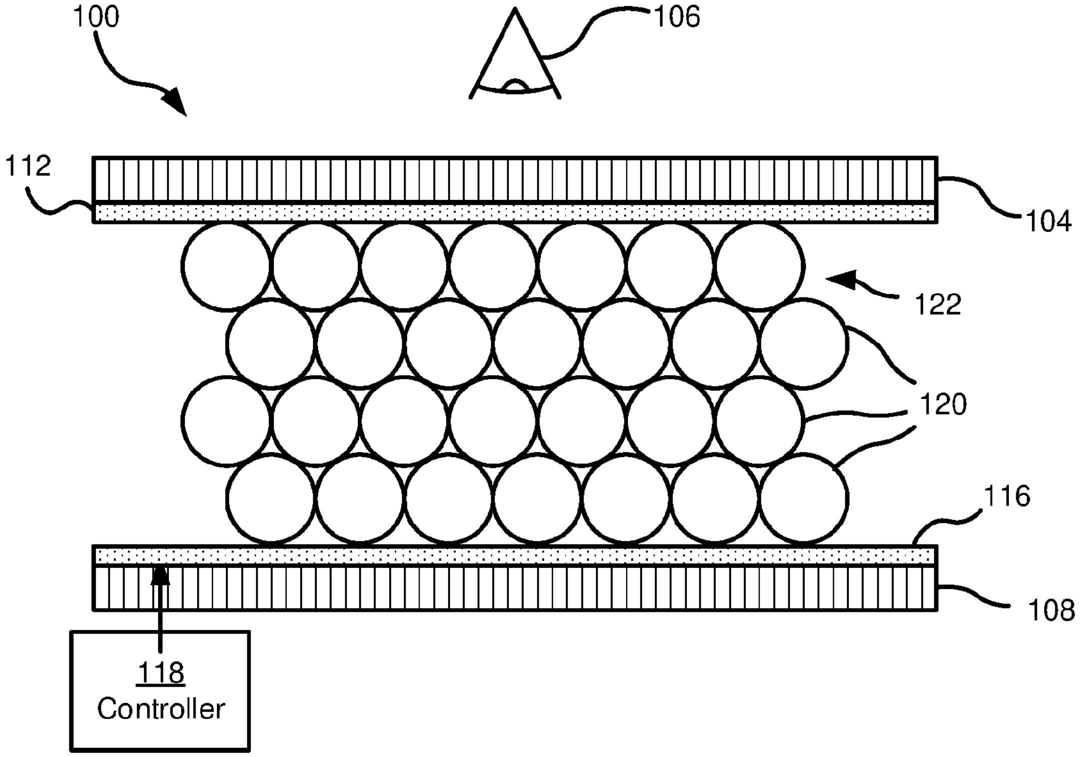
FIG. 1A depicts an example electrophoretic display device including microspheres.

FIG. 1A depicts an example display device 100 employing the above-mentioned electrophoretic media. The display device 100 (also referred to herein as simply device 100) includes an outer substrate 104 (e.g., glass or another suitable translucent or transparent material), referred to as "outer" due to its position away from the interior of the display device 100 and towards a viewer (indicated by the symbol 106). The interior of the display device 100 may house electronics or other control components for the display device 100. The device 100 also includes an inner substrate 108, such as a reflective material; the inner substrate 108 may also be transparent or translucent in some examples. The substrates 104 and 108 are arranged substantially parallel to one another, and substantially perpendicular to the direction of viewing.

Between the inner and outer substrates 108 and 104, the device 100 includes an outer electrode layer 112 and an inner electrode layer 116 (also referred to herein as simply electrodes 112 and 116). The electrodes 112 and 116 may be formed of indium tin oxide (ITO) film. Other materials, such as silver nanowires, may also be employed in addition to or instead of ITO. The outer electrode 112 is translucent or transparent, to allow the passage of ambient light into the assembly 1700 for absorption, transmission, or reflection.

The electrodes 112 and 116 are disposed in a spaced-apart relationship relative to each other. In particular, the outer electrode 112 may be adjacent to the outer substrate 104, and in the present example is directly affixed to the inner side of the outer substrate 104. In other examples, additional materials (e.g., adhesives) may be placed between the outer substrate 104 and the outer electrode 112. Similarly, the inner substrate 116 may be adjacent to the inner substrate 108 and may be affixed to the inner substrate 108. The inner electrode 116 may be translucent or transparent (e.g., an ITO film or an array of silver nanowires), or, in other examples, may provide a reflective surface. In other examples, the electrodes 112 and 116 may be arranged in a spaced-apart relationship laterally on the display, each extending from the inner substrate 108 to the outer substrate 104. In such examples, the electrodes may be made of doped silicon, metal, or other conductive material including a transparent conductive material.

One of the electrodes 112 and 116 is driven by a controller 118 (e.g., connected to the internal electronics of a computing device such as a smartphone or the like), while the other of the electrodes 112 and 116 is a reference electrode.

Between the electrodes 112 and 116, the device 100 includes a plurality of microspheres 120 (referred to generically as a microsphere 120 and collectively as microspheres 120). Preferably, the microspheres 120 are of about the same size, for example, having a dispersity index of between about 1 and 1.2. The microspheres 120 are generally arranged in a lattice between the first and second electrodes. For example, the lattice may be a face-centered cubic packing arrangement, or a hexagonal close packing arrangement, or a combination of the two (i.e., the lattice may be imperfect), or other lattices. The microspheres 120 may be suspended, in some examples, in a suspension fluid 122.

In some examples, the device 100 may further include inner and outer dielectric layers (not shown) between the electrodes 112 and the microspheres 120 to prevent the hydrolysis of the suspension fluid 122 by the electrodes 112 and 116. The device 100 may further include one or more spacer beads (not shown) between the electrodes 112 and 116 to promote uniform spacing of the substrates 104 and 108 as well as the electrodes 112 and 116.

Figure 1B:
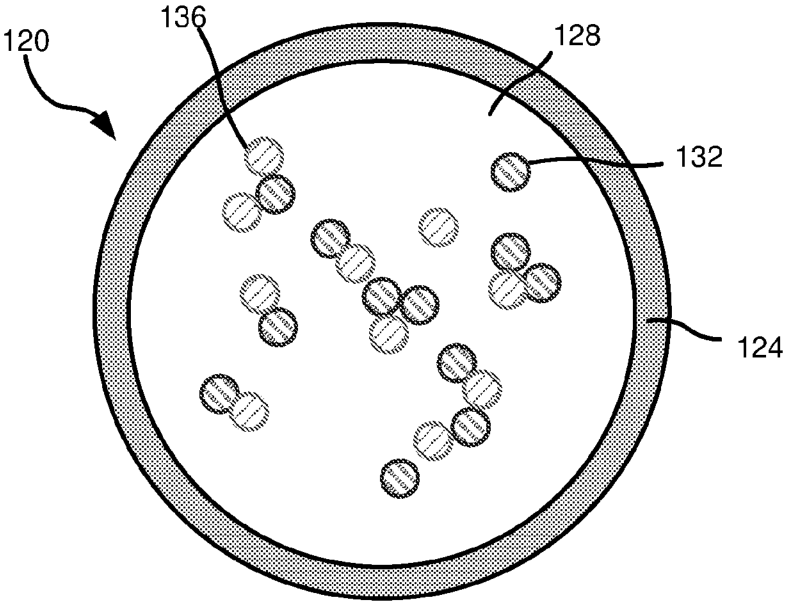
FIG. 1B depicts a microsphere in the electrophoretic display device of FIG. 1.

Referring to FIG. 1B, a microsphere 120 is depicted in greater detail. Each microsphere 120 includes a spherical shell 124 enclosing an electrophoretic media 128. In some examples, the suspension fluid 122 and the fluid comprising the liquid portion of the electrophoretic media 128 may be the same fluid. The electrophoretic media 128 enclosed in the spherical shell 124 contains the above-mentioned charged nanoparticles 132 and 136 comprising first and second chemical entities.

Specifically, the charged nanoparticles 132 and 136 have opposite charges and comprise complementary chemical entities which may be induced to reversibly interact to switch between a separated state and an optically active state in response to a change in an applied electromagnetic field. More particularly, the first and second electrodes 112 and 116 may be controlled to apply an electromagnetic field to the microspheres 120 to change an optical property of the electrophoretic media 128 contained in the microspheres 120.

Each microsphere 120 has a diameter of between about 100 nm to about 20 μm, and preferably between about 300 nm to about 1 μm. In other examples, the diameter of the microspheres 120 may be smaller than 100 nm or larger than 20 μm. The shell 124 of each microsphere has a thickness of between about 5 nm and about 80 nm. The shell 124 may be made of a solid material which is relatively rigid and has a high dielectric constant at low frequency to reduce the voltage drop across the shell material. In particular, the shell 124 is of sufficient width to be substantially nonporous and resistant to mechanical stresses imposed during manufacture and use of the device 100. For example, the shells 124 may be formed of a ceramic or glass material, such as a silica-titania blend. Other suitable materials for forming the shells, such as urea-formaldehyde, may also occur to those skilled in the art.

Figure 2:
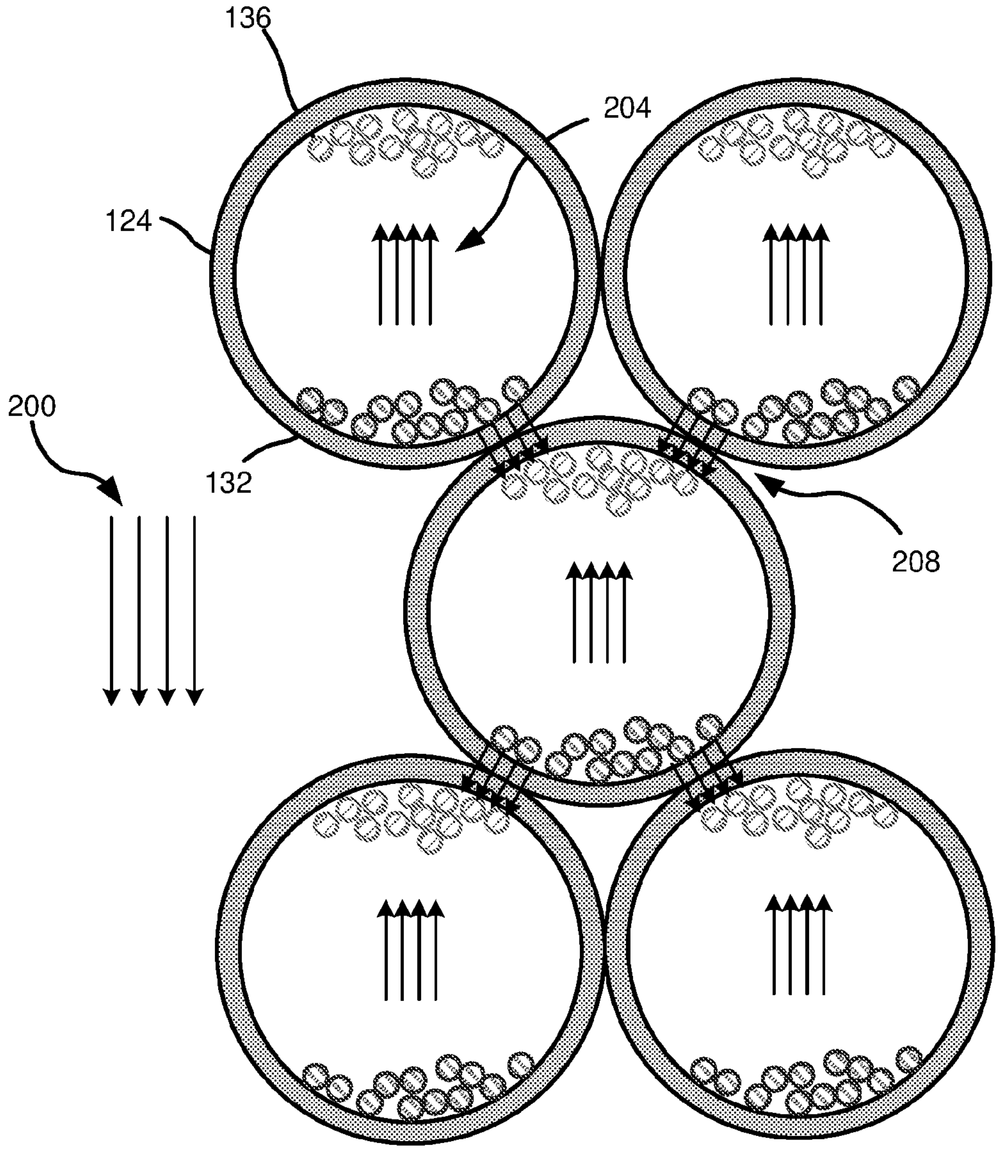
FIG. 2 depicts a portion of the lattice of microspheres in the electrophoretic display device of FIG. 1 under operational conditions.

Referring now to FIG. 2, a portion of the lattice of microspheres 120 is depicted under operational conditions of the device 100. The electrodes 112 and 116 are controllable by a controller 118, which applies a voltage difference to the electrodes 112 and 116 to generate an electric field 200 between the electrodes 112 and 116 across the microspheres 120. The oppositely charged nanoparticles 132 and 136 move to opposite sides of the interior of the microsphere 120 but are contained within the shell 124. The electric field 200 controls the separation between oppositely charged nanoparticles in each microsphere 120 and therefore controls the absorption spectra (and thus the visual appearance) of the electrophoretic media 128 in the microspheres 120. The migration of the nanoparticles 132 and 136 in response to the application of the electric field 200 causes their own opposing induced electric field 204. Additionally, the proximity of the oppositely charged particles 132 and 136 in adjacent microspheres causes inter-microsphere induced electric fields 208. The attraction of oppositely charged particles through the shells 124 and the inter-microsphere induced electric fields 208 promotes a better separation of the oppositely charged particles 132 and 136 with a lower applied electric field, and thus lowers the voltage requirements of the display device 100.

The inclusion of the microspheres 120 in the display device 100 increases the display quality of the display device 100. For example, if the microspheres 120 are provided in substantial quantities to provide multiple layers of the nanoparticles, the contrast of the device 100 is increased as compared to a single layer of nanoparticles.

Specifically, by having multiple layers of particles the number of color absorbing groups through which an incident light ray would pass on its way through the display 100 is increased. The thickness of the display device 100, as defined by the distance between the substrates 104 and 108 may be varied to increase or decrease the contrast provided by the microspheres 120. Specifically, incident light will traverse a larger volume of the electrophoretic media when the thickness of the device 100 increases. The increased thickness and traversal of a larger volume of the electrophoretic media provides for better color absorption, and hence better reflection of the desired colors.

The microspheres 120 also improve the uniformity of the display device 100. For example, the microspheres contain oppositely charged particles 132 and 136 which move in response to the applied electric field 200 and would move along the electric potential gradient, which in some instances may be laterally towards adjacent electrodes, changing the concentration of oppositely charged particles 132 and 136 in different regions of the display device 100. The microspheres 120 restrict this lateral movement, maintaining a substantially uniform distribution across the display device 100. In other words, the microspheres reduce the migration of the electrophoretic media and accumulation of the electrophoretic media in one region of the display device 100 and a lack or depletion of the electrophoretic media in a different region. Accordingly, by employing the microspheres containing the electrophoretic media, each section of the display device 100 will include substantially the same amount of electrophoretic media, dispersed evenly within the microspheres 120.

In some examples, the first and second electrodes 112 and 116, and the microspheres 320 contained therein may form a sub-pixel assembly. That is, the display device 100 may include multiple of such assemblies, for example arranged in a rectangular array, wherein each sub-pixel assembly represents one pixel or part of one pixel of the display device 100. In other examples, the sub-pixel assemblies may be arranged in other suitable arrangements. Thus, a complete display may include a plurality of the sub-pixel assemblies, with each assembly including a pair of spaced apart electrodes to control the electrophoretic media in the microspheres of each pixel (or sub-pixel) independently to allow for regular display capabilities. In some examples, each assembly may include a respective controller 118 and each controller 118 may be connected to a central display processor of the display device 100. That is, the central display processor may communicate with the controllers 118 to apply appropriate voltages to the electrodes 112 and 116 of each assembly according to the image to be displayed on the device 100. In other examples, the central display processor may control the sub-pixel assemblies directly (i.e., the central display processor may act as the controller 118 for each sub-pixel assembly).

Figure 3:
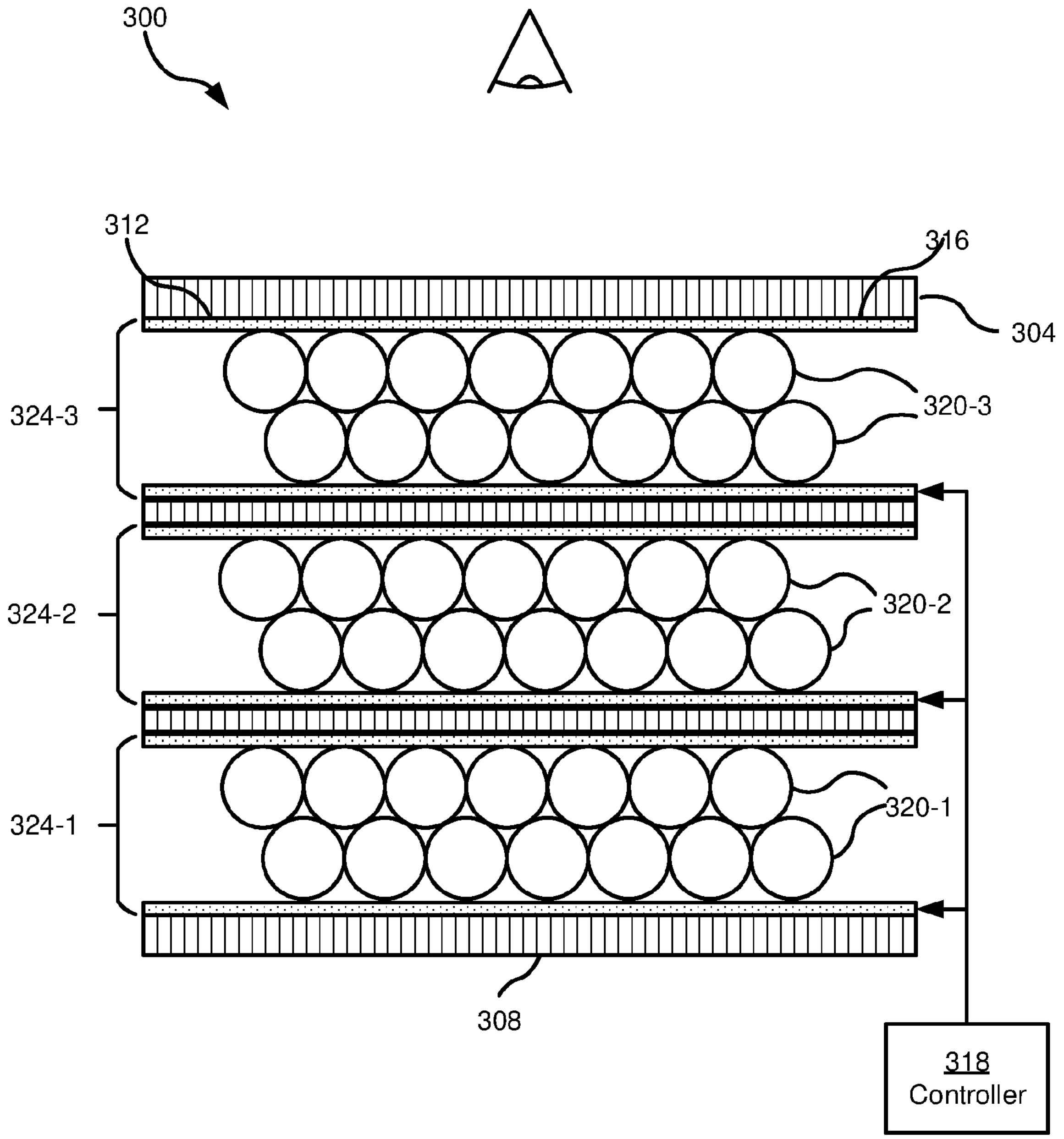
FIG. 3 depicts another example electrophoretic display device including layers of microspheres.

In some examples, the microspheres 120 may be contained in multiple layer structures, and multiple layer structures may be included in the display 100 to allow for different colors to be provided in each layer structure. For example, referring to FIG. 3, another example display device 300 is depicted. The display device 300 is similar to the display device 100, and includes an outer substrate 304, an inner substrate 308, and a plurality of microspheres 320. The device 300 further includes three-layer structures 324-1, 324-2, and 324-2. In particular, the first layer structure 324 contains microspheres 320-1 between first inner and outer electrodes 312-1 and 316-1, the second layer structure 324-2 contains microspheres 320-2 between second inner and outer electrodes 312-2 and 316-2, and the third layer structure 324-3 contains microspheres 320-3 between third inner and outer electrodes 312-3 and 316-3. The device 300 may further include a controller 318 configured to drive a respective one of the inner and outer electrodes 312 and 316 in each layer. For example, each layer structure 324 may be configured to produce a different color (i.e., based on the optical properties of the particles contained in the microspheres in each layer), and hence each controller 318 would drive the respective electrodes 312 and 316 according to the color requirements for a given image. In other examples, each layer 324 may be coupled to a separate controller to control the respective electrodes 312 and 316 independently. As will be appreciated, the sub-pixel assembly structure may also be applicable to the display device 300 of FIG. 3, wherein a sub-pixel assembly is formed of the layer structures 324, and the inner and outer electrodes 312 and 316, and the microspheres 320 contained therein.

Figure 4:
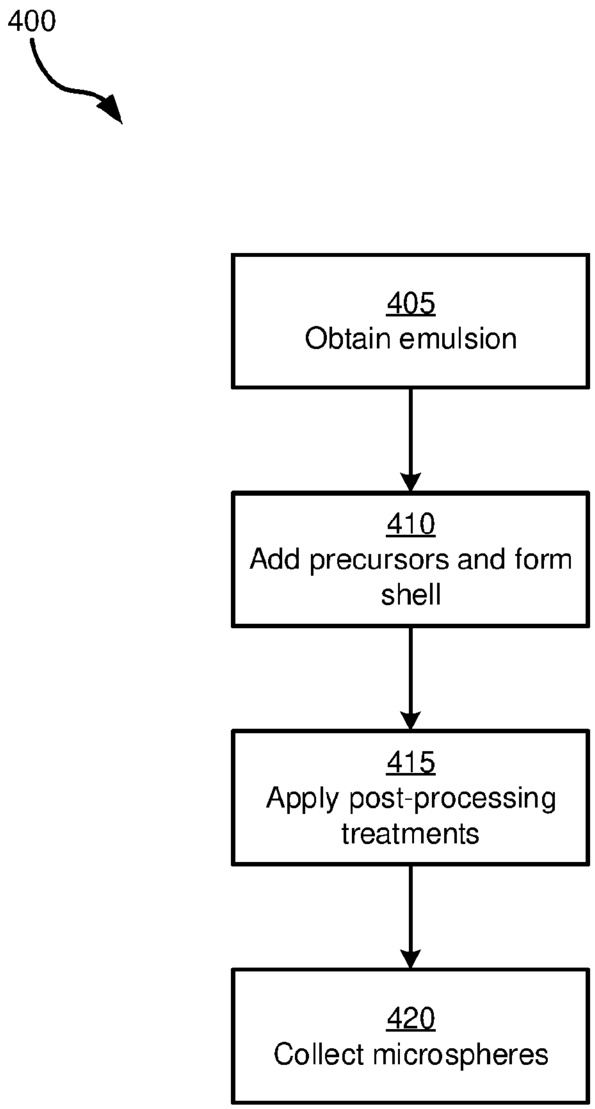
FIG. 4 depicts a flowchart of an example method of fabricating microspheres.

Turning now to FIG. 4, an example method 400 of fabricating microspheres, such as the microspheres 120, is depicted.

The method 400 begins at block 405, at which a water-in-oil emulsion is obtained. In particular, the aqueous phase of the emulsion includes aqueous droplets containing water and electrophoretic nanoparticles. For example, the electrophoretic particles may be synthesized in water, and additives may be added to make up the aqueous phase. The electrophoretic particles, being electrically charged, will typically approximately uniformly disperse in the aqueous phase, allowing for an approximately uniform distribution of the electrophoretic particles in the droplets of the resulting water-in-oil emulsion. In some examples, the aqueous phase may further include one or more polar cosolvents, catalysts, thickening agents and non-ionic surfactants. The oil phase may comprise a solvent such as cyclohexane, polyoxyethylene sorbitan monooleate, polyisoprene, combinations of the above, or the like, as well as non-ionic surfactants and thickening agents contained therein. Preferably, the aqueous droplets have a dispersity index of between about 1 and about 1.2. That is, the aqueous droplets are preferably around the same size.

For example, to obtain a monodisperse emulsion, a course emulsion may first be obtained by adding the aqueous phase to the oil phase in the presence of a surfactant. The volume fraction of the aqueous phase may be between about 50% to about 75% of the total volume of the emulsion. The coarse emulsion may then be sheared into smaller aqueous droplets of nearly uniform size by methods known in the art. For example, the coarse emulsion may be subjected to a high-shear Couette flow to fracture the aqueous phase into the aqueous droplets, or the coarse emulsion may be passed through a homogenizer, one or more porous membranes, microfluidics devices or the like. In some examples, multiple passes and/or multiple shearing methods may be applied to obtain the desired size and size dispersity. Specifically, the aqueous droplets of the emulsion form a template on which the shells 124 of the microspheres 120 are formed. Accordingly, the droplets preferably have a size of between about 300 nm and about 1 μm, and a low size dispersity (i.e., between about 1 and 1.2)

At block 410, precursors are added to the emulsion. The precursor is generally a compound configured to react with the aqueous droplets to form the shells 124 of the microspheres 120. For example, the precursors may be organometallic precursors such as a mixture of tetramethyl orthosilicate (TMOS) [3-(2-Aminoethylamino)propyl] trimethoxysilane (AEAPTMS) and titanium tetrapropoxide (TTIP). More generally the precursors are selected according to the desired shell material for the microspheres 120. The precursors may be added to the emulsion over a predefined period of time. For example, the precursors may be added dropwise to the emulsion over the course of about 2 minutes. More generally precursors may be added to the emulsion slowly to reduce concentration gradients and reduce the likelihood of the microspheres combining and growing together and promote the growth of separate capsules. Further, the emulsion and precursors may be mixed in order to better disperse the precursors in the emulsion to further promote the growth of separate capsules.

When the precursors are added to the emulsion, they reach the surface of the aqueous droplets and are hydrolyzed by the water phase and undergo condensation reactions to form the shell 124. For example, the organometallic precursors may form metal-oxygen-metal bonds, which begin to connect to form a network of glass-like material around the aqueous droplets. In other examples, the precursors may react with the aqueous droplets in a different manner to form the shells 124. For example, polymeric precursors may undergo condensation. Once the surface of a droplet is covered, the reaction becomes diffusion-limited by how quickly the water and precursors can come into contact through the newly formed barrier. Further, as the thickness of the shell 124 increases during formation, the water and/or precursor must diffuse through the existing shell 124 to continue reacting, slowing the reaction down where the shell 124 is thicker. Conversely, the reaction may occur more quickly in regions where the shell 124 is thinner or non-existent. The diffusion-limiting nature of the reaction therefore provides better uniformity in the thickness of the shell 124 around any given droplet and between droplets.

A mixture of different precursors may be added to change the properties of the shell, the reaction rate, and the surface morphology of the shell. For example, elements such as titanium may be used as an additive to increase the dielectric constant of the material, which reduces the voltage drop across the shell. Different precursors may be used to tune the refractive index of the shells so that depending on the choice of suspension fluid 122 and electrophoretic dispersion 128 the shells scatter less of the light incident upon them. For example, the refractive index of the shells 124 may be selected to match the refractive index of the suspension fluid 122, which in turn may be selected to match the refractive index of the electrophoretic dispersion 128. By matching the refractive indices of the shell 124, the suspension fluid 122, and the electrophoretic dispersion 128, each microsphere 120 will scatter less light and overall haze caused by light scattering is reduced.

In some examples, the aqueous droplets and the oil phase may include other components to promote and facilitate the formation of the shell. For example, the aqueous droplets may include a catalyst (e.g., ammonia, in the example given above) to catalyze the shell-formation reactions (e.g., hydrolysis is catalyzed by ammonia, in the example given above). The aqueous droplets and/or the oil phase may further include thickening agents to control the rate of reaction. In particular, thickening agents decrease the diffusion of the precursors to the shell interface, thus slowing down the reaction and allowing the shells 124 to form more uniformly. The oil phase may also include other components to deter the aggregation of the aqueous droplets. For example, long-chain oil soluble polymers, such as polyisoprene, or hydrophobic polymeric nanoparticles can help maintain a hydrophobic barrier between colliding particles. Polymeric surfactants such as poly isoprene-block-vinyl alcohol can be used for steric stabilization of the droplets, which absorb kinetic energy of the droplets when they collide, increasing their resistance to coalescence. After adding the precursors, the emulsion may be agitated (e.g., by stirring) and allowed to react for a predefined period of time (e.g., between about 2 minutes and about 24 hours).

In some examples, prior to adding the precursors to the emulsion, the emulsion may first be diluted to add additional oil phase. For example, the formation of the shell 124 by the precursors may generate alcohols which may affect the aqueous droplet stability. In particular, the alcohols may destabilize the emulsion, causing inversion to an oil-in-water emulsion if the dispersed phase (aqueous) makes up too high of a fraction of the total. Accordingly, dilution of the emulsion (e.g., by a factor of between about 4 times and more than 20 times) may assist in the stabilization of the aqueous droplets after the generation of the alcohols. Further, the emulsions may be diluted to promote uniform coating of the droplets, for example to reduce particle aggregation which may decrease diffusion of the precursors.

Figure 5A:
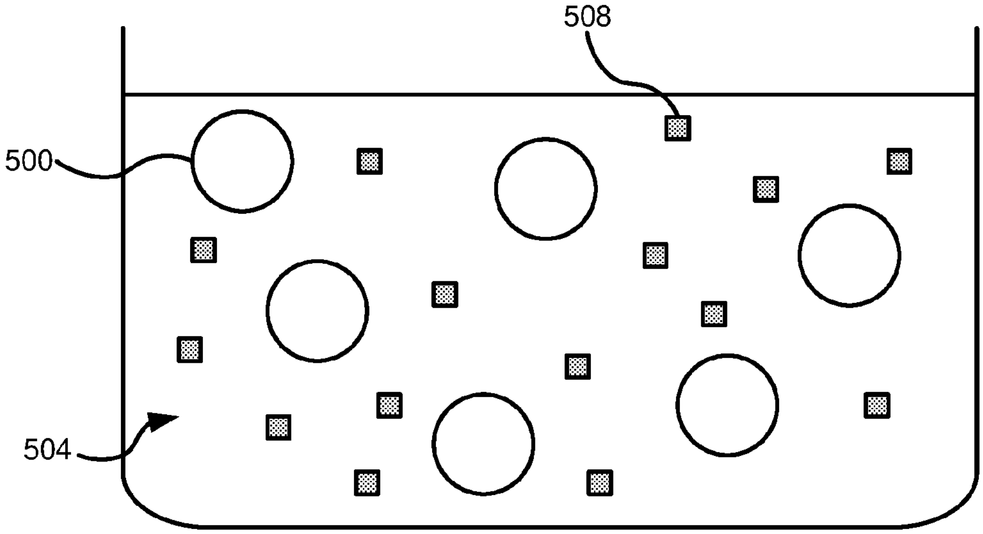
FIGS. 5A and 5B depict an example performance of block 410 of the method of FIG. 4.
Figure 5B:
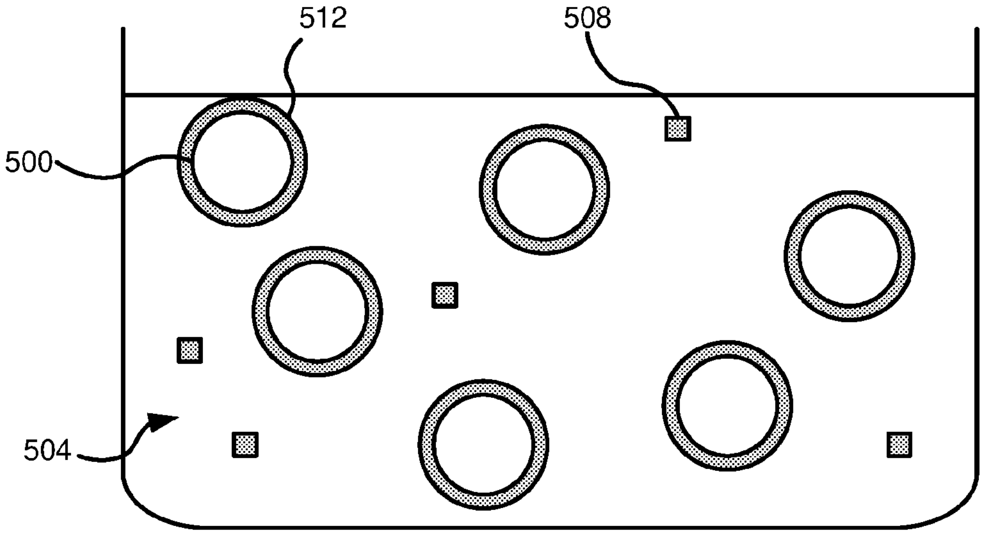

For example, referring to FIGS. 5A and 5B, an example performance of block 410 is depicted. In FIG. 5A, monodisperse aqueous droplets 500 are dispersed in an oil phase 504. Precursors 508 are added to the oil phase. In FIG. 5B, the precursors have diffused to the surface of the droplets 500 and have formed shells 512 around the droplets. Excess precursors 508 may remain in the oil phase 504.

Returning to FIG. 4, at block 415, post-processing treatments may be applied to the microspheres. For example, the post-processing treatments can include adding surface coatings (e.g., hydrolysable silanes, such as aminopropyltriethoxy silane, 3-[Chloro(dimethyl)silyl]propan-1-amine, and similar) to change the solubility of the microspheres (e.g., to make them more easily dispersible in polar media), washing the microspheres in a semi-polar solvent to remove surfactant from the microspheres (e.g., to increase water solubility), exchanging a solvent of the aqueous droplets to remove excess ions and water, and the like. For example, to exchange the solvent, the shells 124 of the microspheres 120 may be porous to allow solvent to be exchanged between the inside and the outside of the shell. The pores may be small enough to prevent the electrophoretic particles from passing through. In particular, pores may be inherently formed based on the production process (i.e., during shell formation by the precursors) of the microspheres 120.

At block 420, the microspheres are collected. For example, the microspheres may be collected via settling or centrifugation, depending on the relative densities of the dispersed and continuous phases. In some examples, the microspheres may also be sorted by size using centrifugation, as settling velocity is highly dependent on the size of the droplet.

Figure 6:
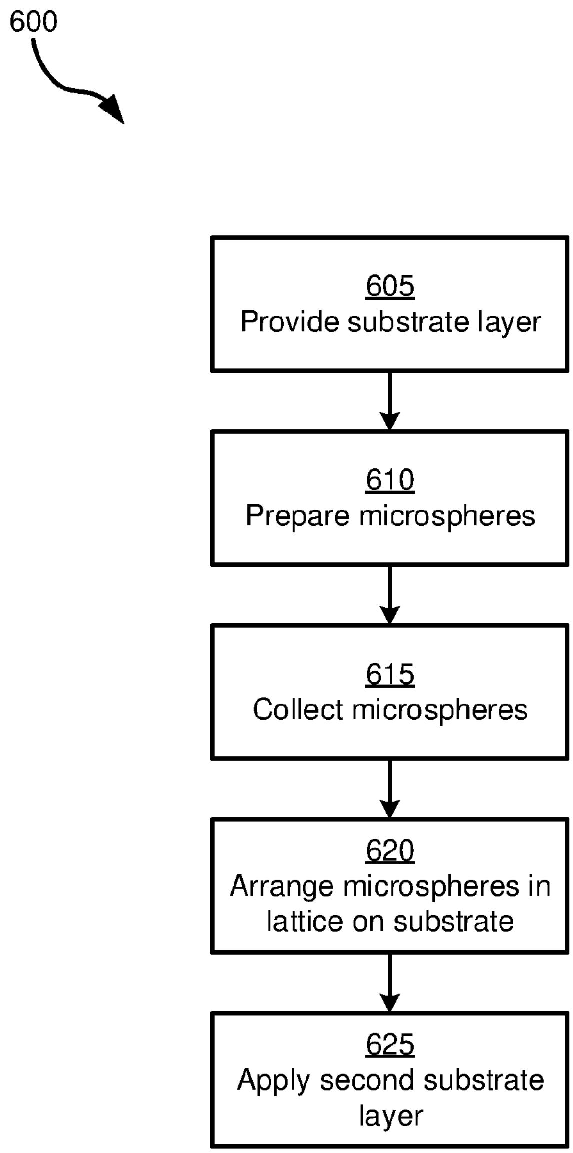
FIG. 6 depicts an example method of fabricating an electrophoretic display device.

Referring now to FIG. 6, an example method 600 of fabricating an electrophoretic display is depicted.

At block 605, a transparent substrate layer is provided. The substrate layer may be either of the substrate layers 104 or 108, as will be seen below. The substrate layer may be, for example, silicon dioxide, borosilicate glass or any other doped silicate. Other suitable dielectric substrates will also occur to those skilled in the art. In some embodiments, a flexible substrate may be provided. The substrate layer is preferably thin in order to decrease the thickness of the display device. However, the substrate layer is also sufficiently thick to withstand the manufacturing process. In some examples, the substrate layer has a thickness of 0.1 to 1 mm. Preferably the substrate layer has a thickness of about 0.3 mm to about 0.6 mm.

At block 610, electrophoretic microspheres are fabricated. The microspheres may be fabricated, for example, according to the method 400. That is, the microspheres may be fabricated by obtaining an emulsion of aqueous droplets dispersed in an oil phase. Specifically, the aqueous droplets include electrophoretic particles. Organometallic precursors may then be added to the emulsion to form shells at respective surfaces of each aqueous droplet to form the microspheres.

At block 615, the microspheres are collected, for example via settling or centrifugation. In some examples, the microspheres may also be sorted by size using centrifugation, as settling velocity is highly dependent on the size of the microsphere. Further, a subset of microspheres for use in the display may be selected. For example, the subset of microspheres may be selected to have a dispersity index of between about 1 and about 1.2.

At block 620, the microspheres are arranged into a lattice on the substrate. The lattice may include one or more layers of microspheres, and preferably, between 7 layers and 100 layers. The lattice may be, for example, a face-centered cubic packing arrangement or a hexagonal close packing arrangement. In other examples, the lattice may be a mixture of the above packing arrangements, or a different packing arrangement.

The lattice may be arranged, for example, via settling and centrifugation of a concentrated suspension of the microspheres. In some examples, the settling and centrifugation may be aided by small amplitude vibrations. In other examples, the microspheres may be suspended in a mixture of solvents, including at least one volatile diluent. The suspension may be spread over the substrate to produce a uniform film on the substrate. The high volatility diluent is allowed to evaporate, during which time the film is compressed to its final thickness by surface tension, forming a lattice in the process.

In some examples, for example in either of the above lattice arrangement processes, the suspension may further include a spacer material, such as uniformly sized silica spheres with a diameter equal to the desired thickness.

In other examples, other suitable processes for arranging the microspheres into a lattice are contemplated.

Figure 7A:
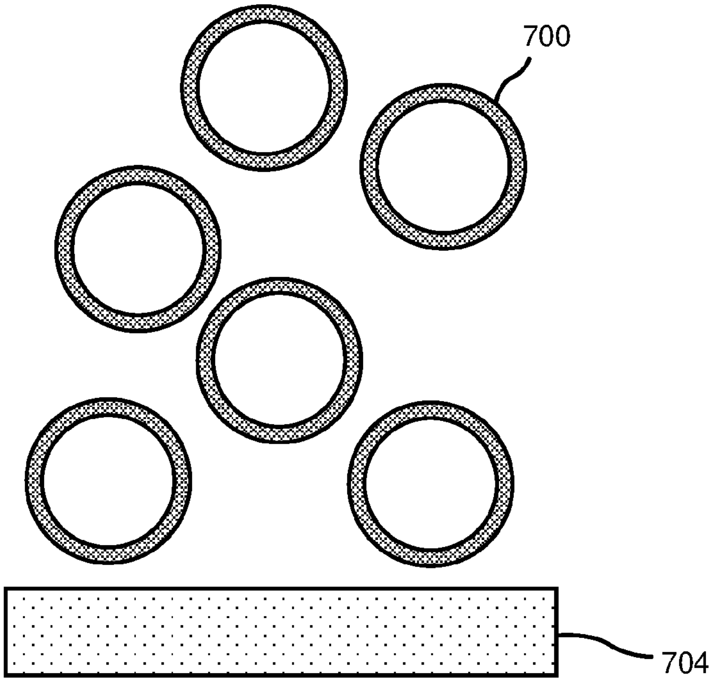
FIGS. 7A and 7B depict an example performance of block 625 of the method of FIG. 6.
Figure 7B:
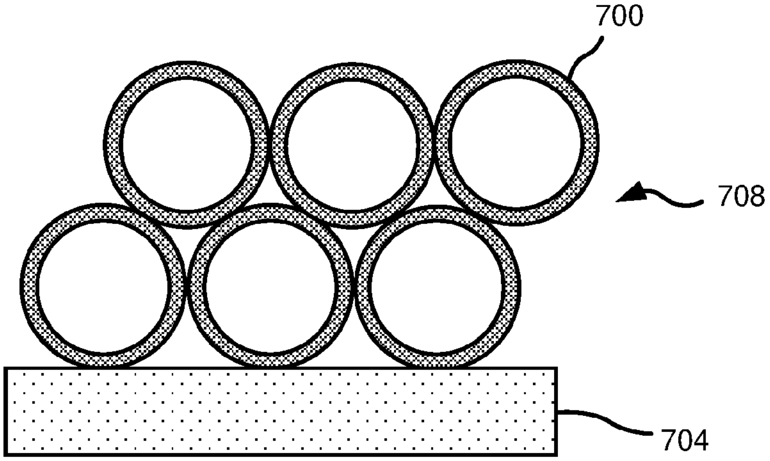

For example, referring to FIG. 7A, a collection of microspheres 700 is deposited onto a substrate 704. In FIG. 7B, the microspheres are arranged into a lattice 708.

Returning to FIG. 6, at block 625, another substrate layer may be applied over the lattice. In some examples, the substrate layer may be the outer substrate 104 (or the inner substrate 108, as applicable). In other examples, the substrate layer may be an intermediary layer on which additional microspheres may be arranged in an additional lattice to form an additional layer. In other examples, the substrate layer may be coated on one or both sides with a transparent conductive material such as indium tin oxide to act as an electrode. The substrate may also have electronic controlling devices patterned onto it which form connections to transparent conductors to drive the sub-pixel assembly.

Advantageously, the microspheres may be deposited as a liquid in the same manner as existing liquid crystal display manufacturing processes. Further, the electrophoretic microspheres reduce the need for polarizers, color filters, and layers to align the liquid crystals in a specific direction. Rather, the microspheres may be stacked in layers to allow for richer color capabilities.

The scope of the claims should not be limited by the embodiments set forth in the above examples but should be given the broadest interpretation consistent with the description as a whole.

The invention claimed is:

1. A display device comprising:

an outer substrate;

an inner substrate;

a first electrode and a second electrode disposed between the inner substrate and the outer substrate in a spaced apart relationship; and a plurality of microspheres between the first and second electrodes, each microsphere comprising a spherical shell enclosing an electrophoretic media; and wherein the electrophoretic media comprises a first chemical entity and a second chemical entity, wherein the first and second chemical entities are to be induced to reversibly interact to switch between a separated state having a first light absorption characteristic and an optically active complex state having a second light absorption characteristic in response to a change in an electromagnetic field applied to the electrophoretic media by the first and second electrodes to change an optical property of the electrophoretic media, and wherein the first light absorption characteristic is transparency and the second light absorption characteristic is the transmission of certain wavelengths, or wherein the first light absorption characteristic is the transmission of certain wavelengths and the second light absorption characteristic is transparency.

2. The display device of claim 1, wherein each microsphere has a diameter of between about 100 nm to about 20 μm.

3. The display device of claim 1, wherein each microsphere has a diameter of between about 300 nm to about 1 μm.

4. The display device of claim 1, wherein a dispersity index of the plurality of microspheres is between about 1 and 1.2.

5. The display device of claim 1, wherein a thickness of the shell of each microsphere is between about 5 nm to about 80 nm.

6. The display device of claim 1, further comprising a layer structure to contain the plurality of microspheres between the first and second electrodes, and wherein the plurality of microspheres are arranged in a lattice within the layer structure.

7. The display device of claim 6, wherein the lattice comprises one of: a face-centered cubic packing arrangement or a hexagonal close packing arrangement.

8. The display device of claim 6, further comprising additional layer structures arranged substantially parallel to the layer structure to contain additional microspheres between the first and second electrodes.

* * * * *